(No Model.)

H. G. FARR.
TRUSS PAD.

No. 321,091.  Patented June 30, 1885.

Witnesses,
Norman H. Stearns Jr.
H. W. Stearns.

Inventor,
Hiram G. Farr,
pr N. W. Stearns,
Atty.

UNITED STATES PATENT OFFICE.

HIRAM G. FARR, OF BOSTON, MASSACHUSETTS.

TRUSS-PAD.

SPECIFICATION forming part of Letters Patent No. 321,091, dated June 30, 1885.

Application filed September 15, 1884. (No model.)

*To all whom it may concern:*

Be it known that I, HIRAM G. FARR, of Boston, in the county of Suffolk and State of Massachusetts, have invented certain Improvements in Pads for Trusses, &c., of which the following is a full, clear, and exact description, reference being had to the accompanying drawings, making part of this specification, in which—

Figure 1:
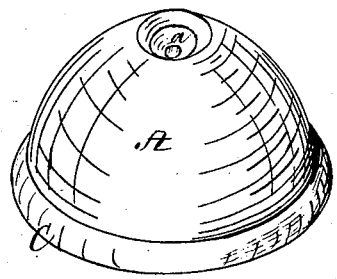
Figure 2:
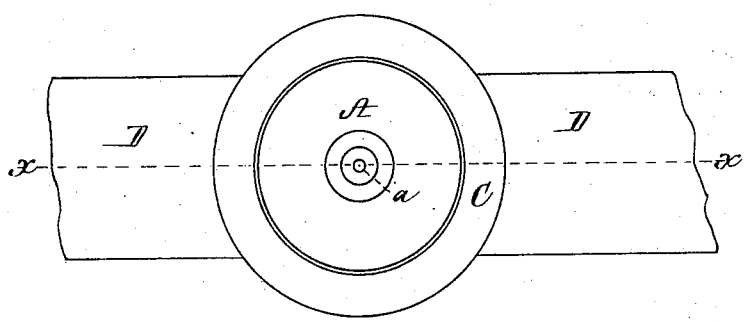
Figure 3:
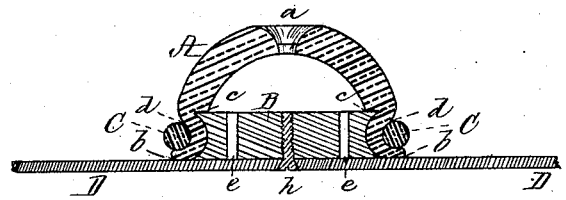

Figure 1 is a perspective view of a truss-pad constructed in accordance with my invention. Fig. 2 is a plan of the same, with a portion of the truss to which it is connected. Fig. 3 is a central section on the line $x\ x$ of Fig. 2.

My present invention relates to that class of pads designed to be used in connection with trusses for the relief of hernia; and this invention consists in an elastic pad provided with an interior shoulder, in combination with an annular plate having a groove extending around its periphery, and a suitable fastening tied or sprung over the pad for confining it upon the grooved plate, the latter being secured to the truss by a screw or other suitable fastening.

My invention also consists in certain passages through the grooved plate and pad, by which the ruptured part is supplied with currents of fresh air.

In the said drawings, A represents a hollow elastic pad of nearly semicircular form, being slightly flattened on its outer surface at its pole, where it is provided with a central opening, $a$, extending through to its interior, said construction being best calculated to support the edges or sides without bearing directly on the aperture of the rupture.

Within the pad, a short distance from its perimeter $b$, is formed an annular square shoulder, $c$, against which rests a circular plate, B, of metal, wood, hard rubber, &c., said plate having a semicircular groove, $d$, formed in its periphery. When the grooved plate is located within the pad, the latter is held in place thereon by an elastic ring, C, sprung over the surface of the pad in line with the groove $d$ in the plate, the pressure produced by the contraction of the ring causing it to force a portion of the pad into the depression formed by the groove, thus preventing the pad from being accidentally separated from the plate. The plate B is secured by a screw, $h$, to the portion of the truss D desired.

$e\ e$ are circular openings through the plate, which, with the central opening $a$ in the pad and hollow space between them, afford a passage for the circulation of fresh air to ventilate and prevent the rupture from being unduly heated.

The elastic pad may be secured to the plate B by cord or wire, &c., if desired.

I claim—

1. The hollow elastic pad A, with its shoulder $c$, and the plate B, with its peripheral groove $d$, in combination with a fastening tied or sprung over the pad, for preventing it from being accidentally separated from the plate, substantially as described.

2. The elastic pad A, with its central opening $a$, the grooved plate B, with its openings $e\ e$, and the elastic ring C, substantially as and for the purpose specified.

Witness my hand this 2d day of September, 1884.

HIRAM G. FARR.

In presence of—
N. W. STEARNS,
H. W. STEARNS.